INVENTOR.
KURT LEHOVEC
BY Connolly & Hutz
HIS ATTORNEYS

2,874,340

RECTIFYING CONTACT

Kurt Lehovec, Williamstown, Mass., assignor to Sprague Electric Company, North Adams, Mass., a corporation of Massachusetts Application June 26, 1953, Serial No. 364,457

6 Claims. (Cl. 317—236)

The present invention relates to a new and improved type of rectifying contact, and in particular, to a rectifying contact which is quite advantageous with transistor and other similar devices.

At the present time two broad types of connections are used in rectifiers, transistors, phototransistors or similar semi-conducting devices. The first of these comprises a solid material, soldered, welded, or plated onto the semi-conductor. The second type consists of a solid material, pressed against the semi-conductor. In many cases a small contact area is desirable, which is achieved conveniently by using pointed wires. There are great difficulties in handling these wires in assembly, as well as difficulties with proper heat dissipation at the contact.

Figure 1:
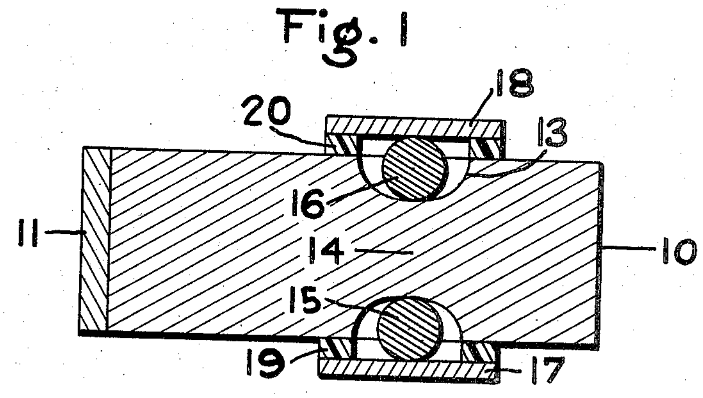
Figure 2:
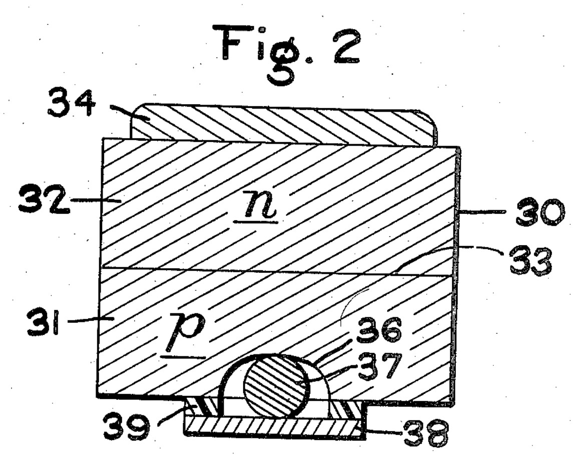
Figure 3:
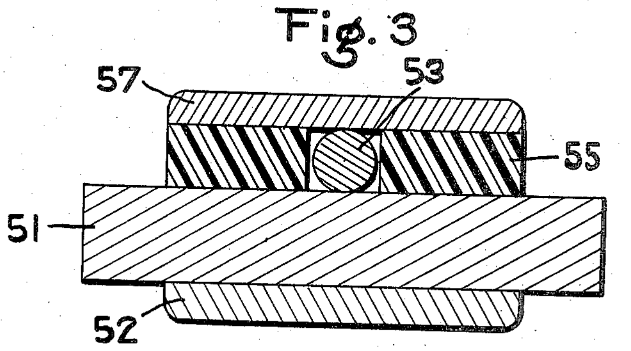

It is an object of the present invention to avoid these and related disadvantages of the prior constructions. A further object is to produce a new type of rectifying contact, which can be used both easily and conveniently with transistors. Still further objects of the invention, as well as advantageous features of it, will be apparent from the body of this specification, the appended claims and the accompanying drawings in which:

Figure 1 diagrammatically shows a transistor utilizing the new contacts of the present invention, and Figure 2 shows a second modified transistor employing the same type of contact, and Figure 3 pictures a rectifier assembly utilizing the inventive contact in a modified form.

Basically, the new rectifying contact of the invention consists essentially of a conducting droplet of a liquid which does not wet the semi-conductor. Mercury used with great success against germanium or silicon as a mercury droplet does not wet these semi-conductors, forms a small contact area, and further forms rectifying contacts if properly treated. Various impurities can be incorporated within the mercury drop so as to create a barrier layer immediately adjacent to the new contacts of the invention as by heating or the like.

The invention is best understood with reference to Figure 1 of the drawings. Here it is shown that transistors employing the new rectifying connections of the invention can consist of a base block 10 to which is attached a base electrode 11 of low ohmic character by plating or other technique known to the art. Two depressions 12 and 13 on opposed surfaces of the block 10 are separated by a thin barrier wall 14. Within depressions 12 and 13 are mercury drops 15 and 16, respectively. These drops are held in position by conductive metal plates 17 and 18, respectively, which are glued or otherwise held against the main body of the block 10 so as to prevent the escape of any of the mercury. When these plates are in the position, the glue itself is usually an adequate insulator sufficient as to prevent any electrical contact being made between the plates 17 and 18 and the block 10 so as to short-circuit the rectifying connection. For absolute safety, it is preferable to incorporate small washers 19 and 20 of an insulating material, such as, for example, polyethylene, between the plates 17 and 18 and the body of the semi-conductive block 10.

The modification of the invention shown in Figure 2 consists essentially of a body of semi-conductive material 30 having regions of p-type and n-type conductivity 31 and 32 joining together so as to form a barrier layer 33. A low resistance base electrode 34, as for example plated indium or rhodium, is positioned upon the end layer 32 in accordance with known procedures used in the art. A similar electrode (not shown) is placed in connection with the p conductivity region 31. The p conductivity region 31 is also provided with a rectifying contact by confining a mercury drop 37 within depression 36 by conductive plate 38 and gasket 39 of an inert dielectric material and which may be held in position by gluing or the like.

In the type of construction shown in Figure 1 of the drawing, a small proportion, up to 2%, of an impurity element capable of changing the conductivity of the base member 10, may be incorporated within the mercury drop. Suitable metals that are soluble in mercury are selected from either the third or the fifth group of the periodic table if the main body is of germanium of either n or p type. Suitable metals are gallium, indium, antimony, arsenic, vanadium, and the like. Similarly, a "hook" type of collector can be formed with the construction of Figure 2 by incorporating the same type of impurities within the mercury drop. In general, it is best to diffuse these impurities into the body of the semi-conductor by heating at a temperature of from about 300 to about 500° C. for a period of from 15 minutes to 2 hours.

Depressions suitable for use with this invention can be created in a number of ways, for example, by a dental type drill or very fine sand blasting type apparatus. The depth of the holes should vary in general from about 8 to about 20 mils, and they should be from approximately 3 to 8 mils in diameter. Particularly satisfactory depressions have a diameter of 14 mils and a depth of 5 mils. If desired, the depressions set forth can be cleaned and etched in accordance with known procedures used in the art, although this is not in general necessary. Similarly, the particular mercury contacts employed with the invention can be formed by dropping mercury from a glass container with a small orifice.

It must be realized that it is not necessary to have the depression upon the surface of the semi-conductor body in all applications and a manner of utilizing the inventive contacts is shown in Figure 3. In this diagrammatical cross section of a rectifier assembly, metallic rectifying point contact 53 is disposed upon the surface of the semi-conducting body 51. Low ohmic contact 52 is applied to body 51 in opposed relationship to point contact 53. Metallic rectifying contact 53 is confined within the region defined by annular gasket 55 and conductive metal plate 57. The metal plate 57 and associated gasket 55 are bonded to the surface of the semiconductor body 51 in the manner previously set forth, so as to prevent any egress of the droplet.

It must be understood that this liquid contact is not necessarily limited to the mercury type contacts heretofore set forth. This liquid contact should not wet the surface of the semiconductor, be conducting in nature, have high surface tension so as to maintain a physical state which is spheroid in character, and it is further preferred that the material be an electronic conductor as distinguished from an ionic conductor. Thus it is seen that many classes of materials may be satisfactory for utilization of this invention, such as organic and inorganic electrolytes, low melting point alloys, and metals dissolved in liquid non-aqueous systems. As specific examples, low melting point alloys, such as Rose's or Wood's alloys, can be used with semiconducting materials, while an excellent contact for low temperature utilization would be alkali metals dissolved in liquid ammonia.

While only three modifications of the present invention have been shown, it will be realized by those skilled in the art that the inventive concept disclosed herein is capable of a great deal of modification. Similarly, two point contacts can be employed in constructions of the broad type shown in Figure 2 of the drawing. These contacts can be either on the same or opposed sides of a p-n junction barrier. The units of the invention can be encased in any of the known manners presently employed in industry, and such encasements are not part of the present invention.

As many apparently widely different embodiments of my invention may be made without departing from the spirit and scope hereof, it is to be understood that my invention is not limited to the specific embodiments hereof except as defined in the appended claims.

What is claimed is:

1. A rectifying point contact consisting of a body of semiconductive material having a concave portion, a drop of mercury positioned in said concave portion, and a terminal lead electrically connected to said mercury drop but insulated from said semiconductive body.

2. In an electronic device, a rectifying connection which comprises a semiconductive body, a depression in a surface of said body, a quantity of mercury positioned against said body within said depression, a metallic plate forming electrical contact with said mercury, and insulating means separating said plate from said semiconductive body.

3. A rectifying contact as defined in claim 2 above wherein said mercury contains an impurity element capable of altering the electrical conductivity of said semiconductive body.

4. A transistor comprising a body of semiconductive material provided with two opposed depressions, a base low ohmic electrical contact to said body, mercury drops positioned within said depressions, and means establishing electrical contact with said mercury depressions.

5. A transistor comprising a crystal of semiconductive material having a concave portion, a drop of liquid metal held against said crystal in said concave portion and a conductor in low ohmic electrical contact with said drop but insulated from the crystal.

6. A rectifying contact comprising a crystal of semiconducting material, means associated with said crystal of such size and shape as to confine a single free-form drop of liquid metal in contact with said crystal; said means comprising an insulator having an opening therethrough and secured to said crystal, and a conductor secured to said insulator and covering said opening; and a drop consisting essentially of mercury within said opening and in contact with said crystal and said conductor.

References Cited in the file of this patent

UNITED STATES PATENTS

| | | |
|---|---|---|
| 1,994,632 | Becker | Mar. 19, 1935 |
| 2,068,557 | Masnou | Jan. 19, 1937 |
| 2,627,545 | Muss et al. | Feb. 3, 1953 |